United States Patent [19]
Schoroth et al.

[11] Patent Number: 5,191,799
[45] Date of Patent: Mar. 9, 1993

[54] MEASURED VALUE RECEIVER FOR VACUUM MEASUREMENT

[75] Inventors: Anno Schoroth, Königsweiler; Theo Koopmann, Brauweiler, both of Fed. Rep. of Germany

[73] Assignee: Leybold AG, Hanau, Fed. Rep. of Germany

[21] Appl. No.: 544,525

[22] Filed: Jun. 27, 1990

[30] Foreign Application Priority Data
Jun. 1, 1989 [DE] Fed. Rep. of Germany ... 8908069[U]

[51] Int. Cl.$^5$ ............................................. G01L 9/00
[52] U.S. Cl. ..................................... 73/753; 324/460; 324/462
[58] Field of Search ................. 73/753, 700; 324/460, 324/461, 462, 463

[56] References Cited

U.S. PATENT DOCUMENTS 3,321,701  5/1967  Crowell ............................ 324/460
4,270,091  5/1981  Mann ............................... 324/462

Primary Examiner—Donald O. Woodiel
Attorney, Agent, or Firm—Spencer, Frank & Schneider

[57] ABSTRACT

The invention relates to a measured value pickup for vacuum measurements, with the pickup including a sensor as well as electronic circuits for supplying the sensor with voltage, and a signal processing device. In order to be able to employ the measure value pickup independently of the location of the measured value processing system, it is proposed to configure it as a transmitter.

12 Claims, 1 Drawing Sheet

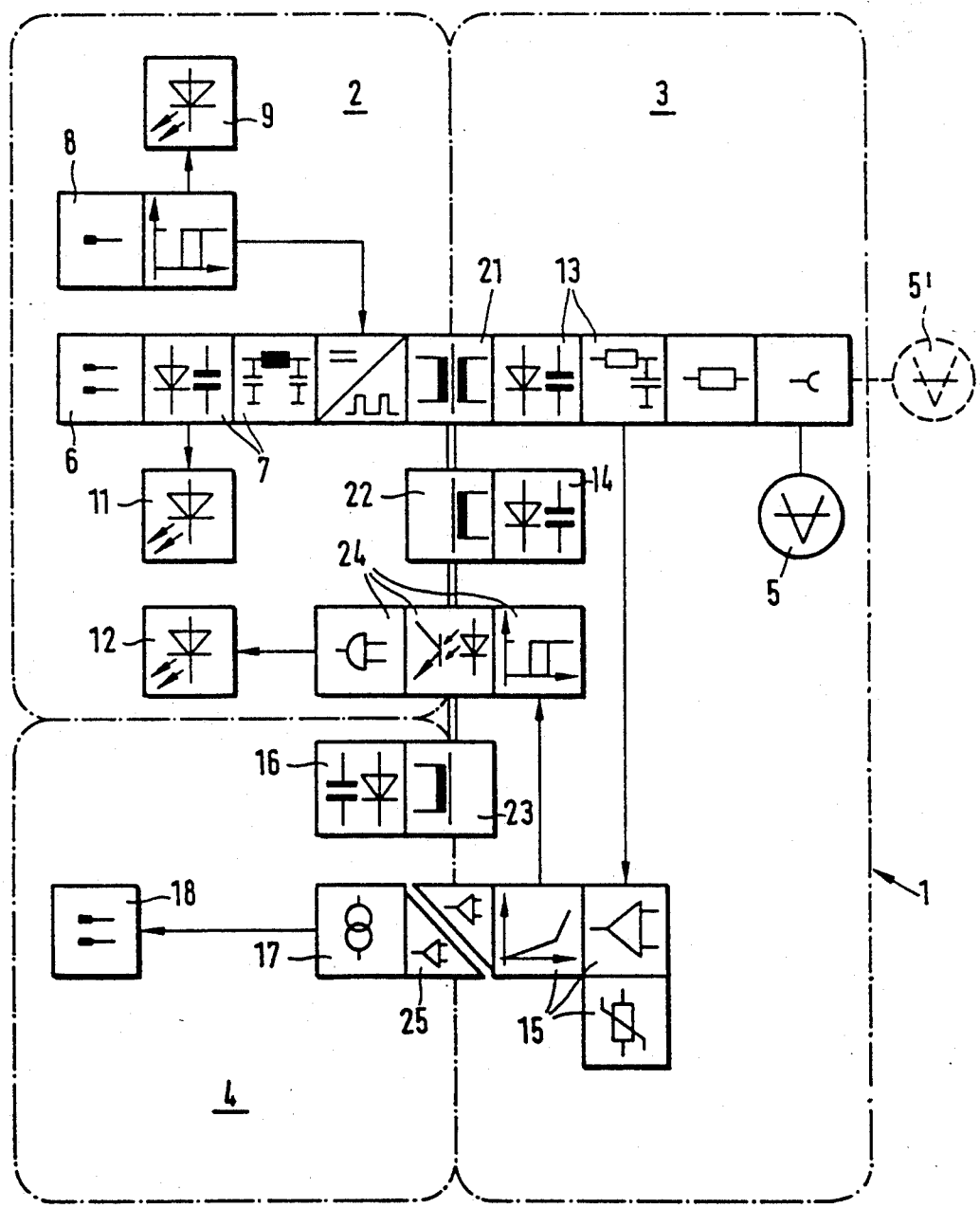

MEASURED VALUE RECEIVER FOR VACUUM MEASUREMENT

BACKGROUND OF THE INVENTION

The invention relates to a measured value pickup for vacuum measurements, with the pickup including a sensor and electronic circuits for supplying the sensor with voltage, signal processing, etc.

In connection with known measured value pickups for vacuum measurements there exists the particular problem that the respective sensors are small and/or sensitive, involve high costs for electrical supplies and furnish relatively small signals (for example current signals in an order of magnitude of a few $\mu$-amperes). In addition to the high costs for supplying them, the costs for electronic signal processing components are also high. Finally, the systems as a whole are very complex so that additional monitoring and control systems are necessary.

Examples for vacuum measuring devices which require the described expenditures for electronic components are ionization vacuometers. These devices measure the pressure by way of the density in the number of particles. Part of the molecules or atoms present in the gas chamber are ionized. The resulting ions transfer their charge to an electrode of the system. The thus generated, very small ion current is a measure for the pressure. The formation of ions takes place either in a discharge at high electrical field intensity or by collision with electrons. Therefore, ionization vacuometers require either a high-voltage supply or a current supply for the relatively high heating current and an anode voltage. Due to the very small measurement voltages, high costs for signal processing are also required.

Another example for a vacuum measuring device including a sensor that involves particularly high supply expenses is the gas friction vacuometer. In this device, the gas friction which is a function of pressure at low gas pressures is utilized to generate a measurement signal. The measuring device employed is, for example, a steel ball which is suspended without contact in a magnetic field. This ball is caused to rotate by electromagnetic pulses. After reaching a high number of revolutions, the drive is switched off so that the number of revolutions decreases more or less rapidly under the influence of the pressure dependent gas friction. Therefore, the decrease in the number of revolutions per unit time is a measure for the existing pressure.

Finally, the sensors of partial pressure vacuum measuring devices also involve high supply costs. Their measured value pickups include an ion source, a separating system and an ion trap. Ion source and separating system (quadrupole, mass dispersive deflection field or the like) require the most varied voltages for operation; the quadrupole separating system, for example, requires a high direct voltage and a high-frequency alternating voltage.

Vacuometers of the described type offered on the market include an operating device performing operational, display, supply, control and monitoring functions. This operating device is relatively large and must be arranged where the pressure to be monitored is to be displayed and/or the associated measured values are processed further. The actual sensor, however, must be located where the recipient is located whose pressure is to be monitored. Due to less than ideal line conditions and/or extraneous interferences, the transmission of the relatively small sensor signal to the operating device without interference is not possible over any desired distance so that the prior art vacuometers can be employed only where the distance between operating device and sensor is not too great, which means that they can be employed only within limits.

SUMMARY OF THE INVENTION

It is the object of the present invention to configure a vacuum measuring device of the above-mentioned type so that it can be reliably employed even where the distance between the measuring location and the monitoring location is relatively great.

This is accomplished according to the invention in that the measured value pickup is configured as a transmitter.

A transmitter is a measurement converter which reshapes the signals from a sensor in order to adapt them to subsequently connected evaluation devices. Since a transmitter no longer includes the evaluation devices themselves, its housing can be substantially smaller than the housing for the prior art vacuometer operating devices. It is therefore possible to accommodate the transmitter directly at the measuring location or at least in the vicinity of the measuring location, depending on whether the sensor is disposed in the transmitter housing or not. Because of the small distance, interference-free transmission of the sensor signals to the electronic signal processing unit is possible even if the sensor is not disposed within the transmitter housing. The electronic system disposed within the transmitter housing serves as voltage supply and as measurement signal processor and converts the signal into a digital or analog output signal, preferably a standardized output signal of four to twenty milliamperes. The transmission of this output signal over long distances—for example, when it is employed in a large system—to a display device disposed at a watch station is possible without interference. Circuits for control purposes and state monitoring may also be disposed in the transmitter housing.

A transmitter of the inventive type may be operated with a small supply voltage, customarily a direct voltage of 24 Volts. Such a supply voltage has found acceptance in larger systems.

A particularly advantageous measure is the galvanic separation of functional regions disposed within the transmitter housing. This results in excellent performance data and reliable operation.

BRIEF DESCRIPTION OF THE DRAWING

Further advantages and details of the invention will be described in connection with an embodiment of a cold cathode ionization vacuometer, according to the invention that is illustrated in the accompanying drawing FIGURE.

DESCRIPTION OF THE PREFERRED EMBODIMENT

The drawing FIGURE shows a transmitter 1 configured according to the invention. It is divided into three circuits, the supply circuit 2, the high-voltage and signal processing circuit 3 and the output circuit 4. The sensor or, more precisely, the measuring tube, is disposed in the high voltage and signal processing circuit 3 and is marked 5. As an alternative, the measuring tube may also be disposed outside transmitter 1. This variation is shown by dashed lines; the measuring tube is marked 5'.

Components of supply circuit 2 are the dual-pole supply voltage port 6 (for example 24 V), a supply voltage filter 7, a single-pole connection socket 8 for the remote controlled turn-on and turn-off of transmitter 1, as well as light-emitting diodes 9, 11 and 12. Light-emitting diode 9 serves to monitor the operating state. Light-emitting diode 11 indicates the supply state. Light-emitting diode 12 serves—as will be described below—to monitor the status of the Penning measuring system.

The high voltage and signal processing circuit 3 includes the electronic components 13 for generating the high voltage, circuit components 14 for supplying voltage to the components disposed in circuit 3, various signal processing stages 15 (such as means for taking the logarithm of the signal, characteristic correction, temperature compensation and the like) and, as already mentioned, measuring tube 5, unless it is disposed outside the circuit.

Logarithmic correction of the characteristic (output signal as a function of pressure) permits simple association with the measured value by means of a mathematically definable formula. No tables are required.

In output circuit 4, the stages for supplying the components included in this circuit with voltage ar marked 16. The circuit further includes a current source 17 for generating an output signal, for example between 4 and 20 milliamperes. By way of measurement signal output 18, the output signal travels to the remotely located display device (not shown).

The various circuits 2, 3 and 4 are galvanically separated from one another. This is initially accomplished by a transformer which includes the windings contained in blocks 21, 22 and 23. With the aid of blocks 21 and 22, circuits 2 and 3 are galvanically separated with respect to the supply voltage. Block 23 performs the same task for the purpose of galvanically separating circuits 3 and 4.

In order to be able to monitor th Penning measuring system in circuit 3 with the aid of the light-emitting diode 12 disposed in circuit 2, switching means 24 are provided which include an optocoupler for galvanically separating circuits 2 and 3.

A stage 25 by means of which switching means 15 and 17 are inductively, capacitively or optically coupled with one another serves to provide galvanic separation in the region of the signal path between circuits 3 and 4.

Advisably, the transmitter furnishes an output signal in a range between 4 and 20 mA. In order to be able to detect from the output signal whether measuring tube 5, 5' is ready to operate, that is, whether the Penning arc has fired, the switching means are selected and the electronic components are dimensioned so that—as long as the Penning system is not operational—output 18 furnishes a measured value which lies outside of the measuring range, for example 2 mA.

According to the invention, sensor 5 can be chosen for a gas friction vacuometer or a partial pressure vacuometer. Thus, the present invention applies to a plurality of vacuum measuring devices.

We claim:

1. A measured value pickup for vacuum measurements, said pickup comprising:

sensor means for sensing characteristics of a vacuum and for producing a signal corresponding to values of the sensed characteristics;

electronic circuit means connected to the sensor means for supplying the sensor means with voltage and for converting and reshaping the signal produced by the sensor means into an electrical output signal suitable for transmission to and use by remotely located evaluation devices;

a transmitter housing;

said electronic circuit means being disposed in the transmitter housing and comprising a supply circuit providing a source of voltage, high-voltage and signal processing circuit means connected for stepping up the voltage provided by the supply circuit to the sensor means and for processing the signal produced by the sensor means, and output circuit means connected to the high voltage and signal processing means for outputting an output signal, corresponding to the processed signal of the sensor means, adapted for transmission to the remote evaluation devices; and means for galvanically separating the supply circuit, high-voltage and signal processing means, and output circuit means from one another.

2. A measured value pickup according to claim 1, wherein said galvanically separating means comprises at least one of a transformer and an optocoupler.

3. A measured value pickup for vacuum measurements, said pickup comprising:

sensor means for sensing characteristics of a vacuum and for producing a signal corresponding to values of the sensed characteristics;

electronic circuit means connected to the sensor means for supplying the sensor means with voltage and for converting and reshaping the signal produced by the sensor means into an electrical output signal suitable for transmission to and use by remotely located evaluation devices; and a transmitter housing;

said electronic circuit means being disposed in the transmitter housing and comprising a supply circuit providing a source of voltage, high-voltage and signal processing circuit means connected for stepping up the voltage provided by the supply circuit to the sensor means and for processing the signal produced by the sensor means, and output circuit means connected to the high voltage and signal processing means for outputting an output signal, corresponding to the processed signal of the sensor means, adapted for transmission to the remote evaluation devices; and wherein said sensor means is disposed outside of said transmitter housing.

4. A measured value pickup for vacuum measurements, said pickup comprising:

sensor means for sensing characteristics of a vacuum and for producing a signal corresponding to values of the sensed characteristics;

electronic circuit means connected to the sensor means for supplying the sensor means with voltage and for converting and reshaping the signal produced by the sensor means into an electrical output signal suitable for transmission to and use by remotely located evaluation devices;

a transmitter housing;

said electronic circuit means being disposed in the transmitter housing and comprising a supply circuit providing a source of voltage, high-voltage and signal processing circuit means connected for stepping up the voltage provided by the supply circuit to the sensor means and for processing the signal produced by the sensor means, and output circuit means connected to the high voltage and signal processing means for outputting an output signal, corresponding to the processed signal of the sensor means, adapted for transmission to the remote evaluation devices, said output circuit means including electronic components for forming an output signal in a range between 4 and 20 milliamperes.

5. A measured value pickup according to claim 4, wherein said sensor means is a measuring tube and said electronic components furnish an output signal having an amperage which lies outside an operating measuring range of the measuring tube when the measuring tube is not operational.

6. A measured value pickup according to claim 5, wherein said high-voltage and signal processing means includes a signal processing system having a stage coupled to the signal produced by the sensor means for taking the logarithm of that signal to correct an output signal characteristic.

7. A measured value pickup according to claim 5, wherein the amperage is preferably two milliamperes.

8. A measured value pickup for vacuum measurements, said pickup comprising:
sensor means for sensing characteristics of a vacuum and for producing a signal corresponding to values of the sensed characteristics;
electronic circuit means connected to the sensor means for supplying the sensor means with voltage and for converting and reshaping the signal produced by the sensor means into an electrical output signal suitable for transmission to and use by remotely located evaluation devices; and
a transmitter housing, said electronic circuit means being disposed in said transmitter housing and comprising a supply circuit providing a source of voltage, high-voltage and signal processing circuit means connected for stepping up the voltage provided by the supply circuit to the sensor means and for processing the signal produced by the sensor means, and output circuit means connected to the high voltage and signal processing means for outputting an output signal, corresponding to the processed signal of the sensor means, adapted for transmission to the remote evaluation devices.

9. A measured value pickup for vacuum measurements, said pickup comprising:
sensor means for sensing characteristics of a vacuum and for producing a signal corresponding to values of the sensed characteristics;
electronic circuit means connected to the sensor means for supplying the sensor means with voltage and for converting and reshaping the signal produced by the sensor means into an electrical output signal suitable for transmission to and use by remotely located evaluation devices;
a transmitter housing;
said electronic circuit means being disposed in the transmitter housing and comprising a supply circuit providing a source of voltage, signal processing circuit means connected for processing the signal produced by the sensor means, and output circuit means connected to the signal processing means for outputting an output signal, corresponding to the processed signal of the sensor means, adapted for transmission to the remote evaluation devices; and means for galvanically separating the supply circuit, signal processing means, and output circuit means from one another.

10. A measured value pickup for vacuum measurements, said pickup comprising:
sensor means for sensing characteristics of a vacuum and for producing a signal corresponding to values of the sensed characteristics;
electronic circuit means connected to the sensor means for supplying the sensor means with voltage and for converting and reshaping the signal produced by the sensor means into an electrical output signal suitable for transmission to and use by remotely located evaluation devices; and
a transmitter housing;
said electronic circuit means being disposed in the transmitter housing and comprising a supply circuit providing a source of voltage, signal processing circuit means connected for processing the signal produced by the sensor means, and output circuit means connected to the signal processing means for outputting an output signal, corresponding to the processed signal of the sensor means, adapted for transmission to the remote evaluation devices; and
wherein said sensor means is disposed outside of said transmitter housing.

11. A measured value pickup for vacuum measurements, said pickup comprising:
sensor means for sensing characteristics of a vacuum and for producing a signal corresponding to values of the sensed characteristics;
electronic circuit means connected to the sensor means for supplying the sensor means with voltage and for converting and reshaping the signal produced by the sensor means into an electrical output signal suitable for transmission to and use by remotely located evaluation devices; and
a transmitter housing;
said electronic circuit means being disposed in the transmitter housing and comprising a supply circuit providing a source of voltage, signal processing circuit means connected for processing the signal produced by the sensor means, and output circuit means connected to the signal processing means for outputting an output signal, corresponding to the processed signal of the sensor means, adapted for transmission to the remote evaluation devices, said output circuit means including electronic components for forming an output signal in a range between 4 and 20 milliamperes.

12. A measured value pickup for vacuum measurements, said pickup comprising:
sensor means for sensing characteristics of a vacuum and for producing a signal corresponding to values of the sensed characteristics;
electronic circuit means connected to the sensor means for supplying the sensor means with voltage and for converting and reshaping the signal produced by the sensor means into an electrical output signal suitable for transmission to and use by remotely located evaluation devices; and
a transmitter housing, said electronic circuit means being disposed in the transmitter housing and comprising a supply circuit providing a source of voltage, signal processing circuit means connected for processing the signal produced by the sensor means, and output circuit means connected to the signal processing means for outputting an output signal, corresponding to the processed signal of the sensor means, adapted for transmission to the remote evaluation devices.

* * * * *

UNITED STATES PATENT AND TRADEMARK OFFICE
CERTIFICATE OF CORRECTION

PATENT NO. : 5,191,799

DATED : Mar. 9, 1993

INVENTOR(S) : Schoroth et al.

It is certified that error appears in the above-identified patent and that said Letters Patent is hereby corrected as shown below:

On the title page:
Item 30: Change "June 1, 1989" to --July 1, 1989--.

Signed and Sealed this

Twenty-third Day of November, 1993

Attest:

BRUCE LEHMAN

Attesting Officer     *Commissioner of Patents and Trademarks*